United States Patent [19]

Hitachi et al.

[11] Patent Number: 4,987,034
[45] Date of Patent: Jan. 22, 1991

[54] HIGH-EFFICIENCY METAL-MADE CARRIER BODY FOR EXHAUST GAS CLEANING CATALYST

[75] Inventors: Yuzo Hitachi, Shizuoka; Kazunori Takikawa, Numazu, both of Japan

[73] Assignee: Usui Kokusai Sangyo Kabushiki Kaisha, Japan

[21] Appl. No.: 504,076

[22] Filed: Apr. 4, 1990

Related U.S. Application Data

[63] Continuation of Ser. No. 289,023, Dec. 23, 1988, abandoned.

[30] Foreign Application Priority Data

Dec. 28, 1987 [JP] Japan ................ 62-197359

[51] Int. Cl.⁵ .................... B01J 35/02; F01N 3/24
[52] U.S. Cl. .................... 428/593; 428/596; 428/597; 428/608; 502/439; 502/527; 422/180
[58] Field of Search .............. 428/592, 593, 596, 608, 428/603, 597; 502/439, 527; 422/180

[56] References Cited

U.S. PATENT DOCUMENTS

| | | | |
|---|---|---|---|
| 2,733,177 | 1/1956 | Meyer | 428/603 |
| 4,152,302 | 5/1979 | Nonnenmann et al. | 502/527 |
| 4,162,993 | 7/1979 | Retallick | 428/592 |
| 4,233,183 | 11/1980 | Inaba et al. | 502/527 |
| 4,388,275 | 6/1983 | Fratzer et al. | 502/527 |
| 4,455,281 | 6/1984 | Ishida et al. | 502/527 |
| 4,576,800 | 3/1986 | Retallick | 502/439 |
| 4,647,435 | 3/1987 | Nonnenmann et al. | 422/180 |
| 4,665,051 | 5/1987 | Nonnenmann et al. | 502/439 |
| 4,753,918 | 6/1988 | Cyron | 502/439 |

FOREIGN PATENT DOCUMENTS

| | | | |
|---|---|---|---|
| 55-70348 | 5/1980 | Japan | 502/527 |
| 62-71547 | 4/1987 | Japan | 502/439 |
| 90742 | 6/1987 | Japan . | |
| 63-134061 | 6/1988 | Japan | 502/439 |
| 2040179A | 8/1980 | United Kingdom | 502/527 |

OTHER PUBLICATIONS

Webster's Third New International Dictionary, 1961, G & C Merriam Co., "Interlock", p. 1179.

*Primary Examiner*—John J. Zimmerman
*Attorney, Agent, or Firm*—Lowe, Price, LeBlanc, Becker & Shur

[57] ABSTRACT

Disclosed herein is an exhaust gas cleaning device which is suitable for arrangement at an intermediate point in an exhaust gas system of an automotive vehicle and has good efficiency. The exhaust gas cleaning device includes a metal-made carrier body for an exhaust gas cleaning catalyst. The carrier body is composed of a multi-layered composite body by superposing one over the other at least one planar metal band made of a thin metal sheet and at least one corrugated metal band made of another thin metal sheet and defining many network-patterned gas flow passages along a central axis thereof to allow an exhaust gas to axially flow as streams through the gas flow passages. At least one of the bands defines many holes and many raised portions, preferably, ridges around or near the respective holes. As an alternative, at least one of the bands is made of a metal wire net.

8 Claims, 2 Drawing Sheets

HIGH-EFFICIENCY METAL-MADE CARRIER BODY FOR EXHAUST GAS CLEANING CATALYST

This application is a continuation application of application Ser. No. 07/289,023, filed Dec. 23, 1988 now abandoned.

BACKGROUND OF THE INVENTION (1) Field of the Invention

This invention relates to a metal-made carrier body for an exhaust gas cleaning catalyst which is generally interposed as an exhaust gas cleaning means at an intermediary point in an exhaust gas system of an automotive vehicle. More specifically, this invention is concerned with a metal-made carrier body for an exhaust gas cleaning catalyst, which makes use of a means for efficiently converting streams of an exhaust gas into turbulent flows, thereby enhancing the cleaning efficiency of the exhaust gas.

(2) Description of the Related Art

With a view toward increasing the catalyst-carrying area per unit volume and at the same time reducing their own weights, metal-made carrier bodies for carrying an exhaust gas cleaning catalyst of the above sort have heretofore been manufactured by superposing at least one planar band and at least one corrugated band, each of said bands being made of a heat-resistant steel sheet of an extremely small thickness not greater than 0.1 mm, one over the other and then rolling them together into a spiral form or as an alternative, arranging them in layers, thereby forming a multi-layered composite body defining many network-patterned gas flow passages in a common direction, and thereafter enclosing the multi-layered composite body in a metal-made casing which is open at both ends thereof.

A great deal of work has recently been conducted with respect to metal-made carrier bodies of the above sort to improve the efficiency of contact between an exhaust gas and a catalyst and hence to enhance the cleaning efficiency. For example, Japanese Utility Model Laid-Open 90742/1987 discloses a carrier body formed of a planar metal band and a corrugated metal band, through each of which plural holes of about 0.5–10 mm in diameter are formed at a concentration of from 1 to about 10 holes per $cm^2$.

SUMMARY OF THE INVENTION

The above-described metal-made carrier body having the multi-layered composite body of the planar metal band and corrugated metal band and adapted to carry an exhaust gas cleaning catalyst thereon is not so simple as a greater catalyst-carrying area would result in higher cleaning ability for an exhaust gas. In particular, each stream of the exhaust gas is in the form of a laminar flow along the axis of the metal-made carrier body of the above sort, in other words, in the flowing direction of the exhaust gas. Accordingly, the exhaust gas in a layer which is brought into contact with a catalyst-carrying surface is cleaned, but the exhaust gas in a layer whose contact to a catalyst-carrying surface is prevented is caused to pass through the metal-made carrier body without purification.

The metal-made carrier body of the above sort cannot therefore be provided with fully-satisfactory cleaning ability even when it is modified in such a way that its axial length is increased or plural holes are formed through each of the planar metal band and corrugated metal band forming the metal-made carrier body.

An object of this invention is hence to provide a metal-made carrier body having excellent cleaning ability for an exhaust gas by providing a means for efficiently converting streams of the exhaust bas into turbulent flows within the carrier body.

In one aspect of this invention, there is thus provided a metal-made carrier body for an exhaust gas cleaning catalyst. The carrier body is composed of a multi-layered composite body which has been formed by superposing one over the other at least one planar metal band made of a thin metal sheet and at least one corrugated metal band made of another thin metal sheet and defines many network-patterned gas flow passages along a central axis thereof to allow an exhaust gas to axially flow as streams through the gas flow passages. At least one of the bands defines many holes there-through and has many raised portions around or near the respective holes. As an altertive, at least one of the bands is made of a metal wire net.

Since the streams of the exhaust gas flowing through the gas flow passages respectively are converted into turbulent flows by the turbulence applying means, the metal-made carrier body of this invention for carrying an exhaust gas cleaning catalyst thereon allows a catalyst carried thereon to act effectively so that the cleaning efficiency of the exhaust gas can be improved.

As a secondary effect, the metal-made carrier body of this invention has made it possible to use a scarce and expensive metal as a catalyst in an amount reduced compared to conventional metal-made carrier bodies. In addition, the turbulence applying means also serves to increase the catalyst-carrying area so that the metal-made carrier body of this invention can be reduced in weight correspondingly.

BRIEF DESCRIPTION OF THE DRAWINGS

The above and other objects, features and advantages of the present invention will become apparent from the following description and the appended claims, taken in conjunction with the accompanying drawings, in which:

These drawings are merely illustrative and should not be construed as limiting the scope of the present invention.

DETAILED DESCRIPTION OF THE INVENTION

Each metal-made carrier body of this invention, which is suitable for use in carrying an exhaust gas cleaning catalyst thereon, is composed of a multi-layered composite body formed by superposing one over the other at least one planar metal band made of a thin metal sheet and at least one corrugated metal band made of another thin metal sheet and defining many network-patterned gas flow passages along a central axis thereof. The bands may each be formed, for example, of a steel sheet obtained by working, specifically, rolling a heat-resistant steel, which contains about 15–20% of chromium, about 2–7% of aluminum and if necessary, one or more rare earth elements, to a thickness of about 0.03–0.1 mm or so.

Figure 1:
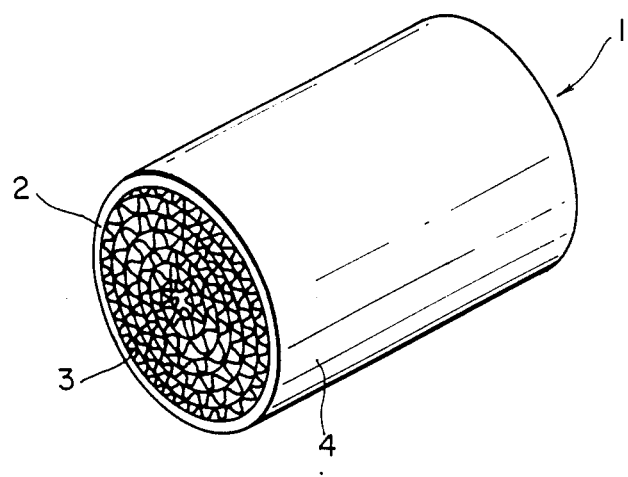
FIG. 1 is a perspective view of a metal-made carrier body according to a first embodiment of this invention.

Referring first to FIG. 1, a metal-made carrier body 1 has been formed by superposing a planar metal band 2 and a corrugated metal band 2 one over the other to establish contacts therebetween and then rolling them together into a spiral form, whereby the metal-made carrier body 1 takes the form of a multi-layered composite body defining many network-patterned gas flow passages along a central axis thereof.

Figure 2:
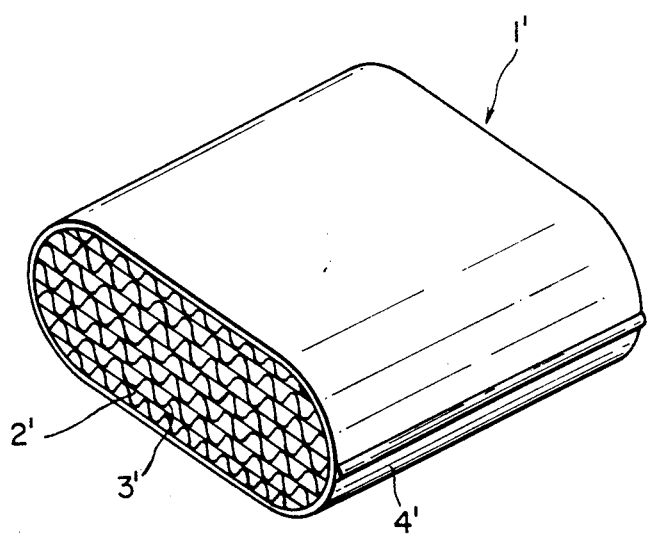
FIG. 2 is a perspective view of a metal-made carrier body according to a second embodiment of this invention.

Referring next to FIG. 2, a metal-made carrier body 1' has been formed by alternately superposing planar metal bands 2' and corrugated metal bands 3' in layers so that the metal-made carrier body 1' takes the form of a multi-layered composite body defining many network-patterned gas flow passages along a central axis thereof.

These multi-layered composite bodies are each enclosed in a metal-made casing. Contacts between the bands themselves and those between the multi-layered composite body and its associated casing are bonded by welding, brazing or the like. Catalyst-carrying layers made of alumina or the like are then formed with a wash coating formulation, and an exhaust gas cleaning catalyst such as platinum, rhodium or palladium is next carried to use the resultant unit as a catalytic converter for exhaust gas.

The principal feature of this invention resides in the use of a metal band, which is provided with a turbulence applying means, as at least one of the planar metal band 2(2') and corrugated metal band 3(3') forming the multi-layered composite body, so that the streams of the exhaust gas passing through the multi-layered composite body are efficiently converted into turbulent flows to improve the efficiency of contact between the exhaust gas and the catalyst carried on the multi-layered composite body.

The following embodiments may be mentioned as the turbulence applying means provided with at least one of the planar metal band 2(2') and corrugated metal band 3(3').

(i) At least one of the planar metal band and corrugated metal band has a number of holes and a number of raised portions around or near the holes respectively.

(ii) At least one of the planar metal band and corrugated metal band is made of a metal wire net.

(iii) One of the bands has holes and raised portions provided around or near the holes respectively or is made of a metal wire net, while the other band is made of a sheet defining a number of holes therethrough.

Figure 3:
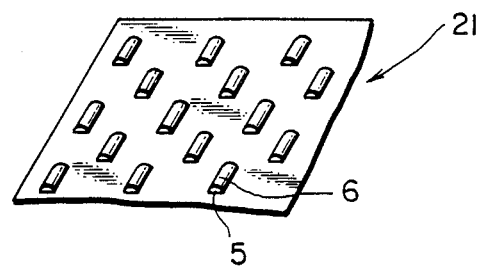
FIG. 3 is a fragmentary perspective view of an exemplary planar metal band, which has a number of holes and raised portions formed near the holes respectively and is useful in the practice of this invention.
Figure 4:
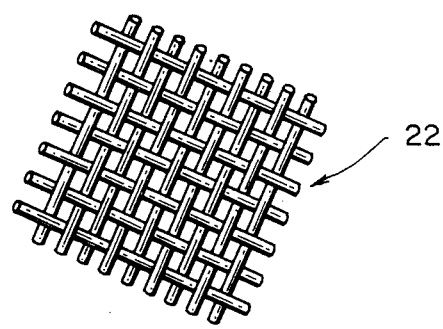
FIG. 4 is a fragmentary perspective view of another exemplary planar metal band, which is made of a metal wire net and is also useful in the practice of this invention.
Figure 5:
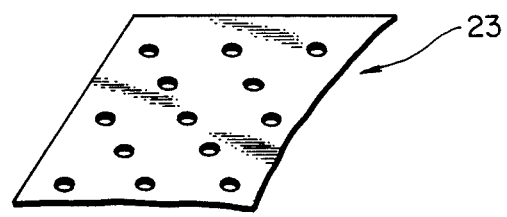
FIG. 5 is a fragmentary perspective view of a further exemplary planar metal band, which defines a number of holes therethrough and is also useful in the practice of this invention.

The planar metal bands depicted respectively in FIG. 3 through FIG. 5 are provided with a turbulence applying means and are useful in the practice of this invention. Corrugated metal bands can be provided with a turbulence applying means in much the same way. Illustration of such corrugated metal bands in drawings is therefore omitted herein.

The planar metal band designated at numeral 21 in FIG. 3 is useful in the practice of this invention and has holes 5 and ridges 6 provided as raised portions near the respective holes 5. The ridges 6 are arranged with their lengths lying at right angles to an exhaust gas stream.

The raised portions may take any shape, including fins, louvers, projections or ridges by way of example, provided that they have a function to convert streams of an exhaust gas into turbulent flows.

The planar metal band indicated at numeral 22 in FIG. 4 is a metal wire net which is also useful in the practice of this invention. This metal wire net 22 may be used in combination with the planar metal band of FIG. 3. The metal wire net 22 may be formed by weaving stainless steel wires which may have a diameter in a range of from about 0.05 mm to about 0.25 mm by way of example.

The planar metal band designated at numeral 23 in FIG. 5 is used in combination with the planar metal band of FIG. 3. It is a metal sheet perforated by a mechanical means such as a press.

The present invention will hereinafter be described in further detail by the following Examples. It should however be borne in mind that this invention is not limited to them, because many changes and modification can be made thereto without departing from the spirit or scope of the invention as set forth herein.

Example 1

(i) Planar metal band

Slits of 2 mm wide and 5 mm long were cut in plural rows and in a staggered pattern through a band which had been made of a heat-resistant steel containing 20% of chromium and 5% of aluminum and had a thickness of 0.05 mm and a width of 74.5 mm. Louvers of 0.5 mm high were raised further.

(ii) Corrugated metal band

A heat-resistant band of the same type as the planar metal band was worked into a corrugated form having a ridge-to-ridge pitch of 2.5 mm and a ridge height of 1.2 mm.

(iii) Carrier body

The above planar metal band and corrugated metal band were superposed one over the other, thereby obtaining a multi-layered composite body having an oval cross-section of 120 mm × 70 mm and a length of 90 mm. After bonding the multi-layered composite body at certain points by welding, it was inserted in a casing having an inner cross-section of substantially the same shape as the multi-layered composite body. They were bonded together by welding. As a result, a carrier body having excellent effects in forming turbulent flows was successfully obtained.

Example 2

(i) Planar metal band

A planar metal band of the same type as that employed in Example 1 was used.

(ii) Corrugated metal band

Used was a perforated sheet obtained by boring holes having a diameter of 1 mm at intervals of 3 mm in a staggered pattern through a heat-resistant metal band of the same type as the planar metal band. The perforated sheet was worked into a corrugated form having a ridge-to-ridge pitch of 3.5 mm and a ridge height of 1.8 mm.

(iii) Carrier body

The above planar metal band and corrugated metal band were superposed one over the other and then wound together into a spiral form to obtain a multi-layered composite body. The multi-layered composite body was fitted under pressure into a cylindrical casing whose inner diameter was approximately 70 mm. After coating the resultant assembly with a brazing material, it was subjected to a heat treatment to braze the contacts between the bands themselves and those between the multi-layered composite body and the metal casing.

In the manner described above, a carrier body having excellent effects in forming turbulent flows was successfully obtained.

Example 3

(i) Planar metal band

Employed was a wire mesh obtained by weaving stainless steel (SUS 304) wires of 0.12 mm in diameter into a plain weave and having a width of 74.5 mm.

(ii) Corrugated metal band

A corrugated metal band of the same type as that employed in Example 1 was used.

(iii) Carrier body

The above planar metal band and corrugated metal band were superposed one over the other and then wound together into a spiral form to obtain a multi-layered composite body. In a similar manner as in Example 2, the multi-layered composite body was enclosed within a casing, followed by brazing to successfully obtain a carrier body having excellent effects in forming turbulent flows.

We claim:

1. In a metal carrier body for an exhaust gas cleaning catalyst, said carrier body comprising a multi-layered composite body formed by superimposing one over the other at least one planar metal band made of a thin metal sheet and at least one corrugated metal band made of another thin metal sheet and defining many network-patterned gas flow passages along a central axis thereof to allow an exhaust gas to axially flow as streams through the gas flow passages, the improvement wherein at least one of said bands includes a plurality of through-holes therein having raised portions around or adjacent said through-holes for creating turbulent flow of exhaust gas through said carrier body said through-holes and raised portions being arranged and dimensioned so as to preclude interlocking between adjacent metal bands thereby.

2. The metal carrier body as claimed in claim 1, wherein said raised portions comprise ridges.

3. The metal carrier body as claimed in claim 2, wherein said ridges are arranged with lengths thereof aligned at right angles to said central axis.

4. The metal carrier body as claimed in claim 1, wherein said metal carrier body comprises two metal bands, one of said bands including a plurality of through-holes therein having raised portions around or adjacent said through-holes and said other band comprising a metal wire net.

5. The metal-made carrier body as claimed in claim 1, wherein said metal carrier body comprises two metal bands, one of said bands includes a plurality of through-holes therein having raised portions around or adjacent said through-holes and said other band comprising a perforated metal sheet.

6. The metal-made carrier body as claimed in claim 1, wherein each of said bands includes a plurality of through-holes having raised portions around or adjacent said through-holes.

7. The metal-made carrier body as claimed in claim 1, wherein said multi-layered structure is obtained by superimposing said bands one over the other to establish contacts therebetween and then rolling the thus-superposed bands together into a spiral form to define said gas flow passages along said central axis thereof.

8. The metal-made carrier body as claimed in claim 1, wherein said multi-layered structure is obtained by superimposing said bands one over the other in layers, whereby said multi-layered structure defines said gas flow passages along said central axis thereof.

* * * * *